Sept. 21, 1965 E. KOPPELMAN ETAL 3,207,185
WOVEN PANEL AND METHOD OF MAKING SAME
Original Filed Feb. 23, 1961 12 Sheets-Sheet 1
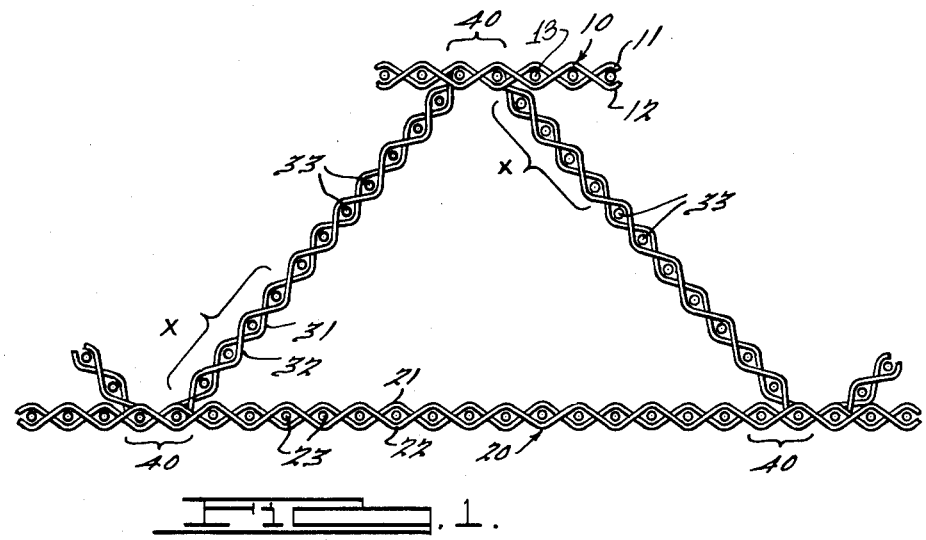
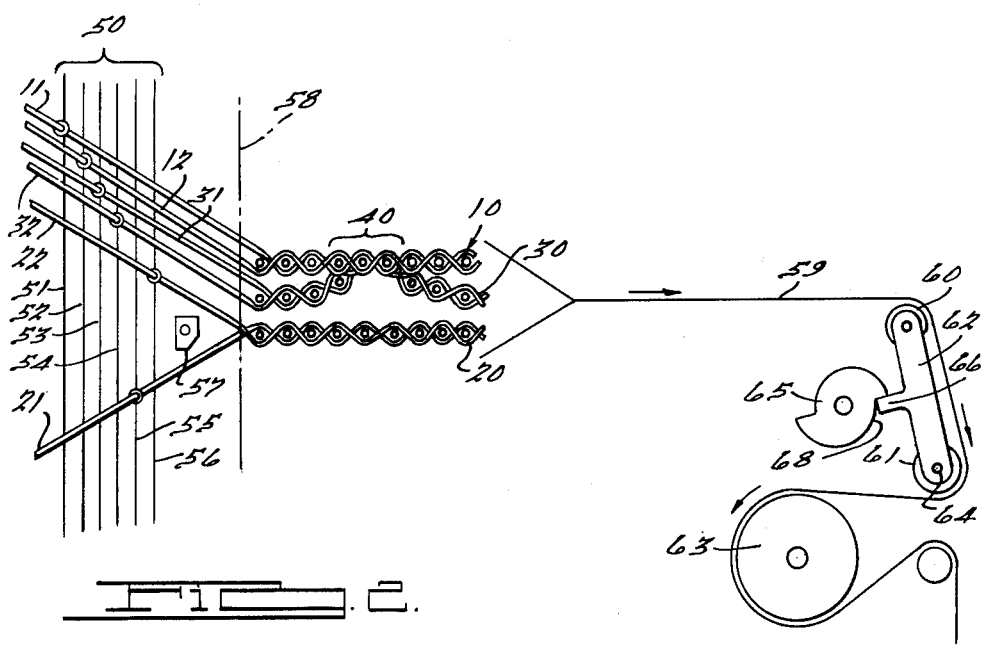
INVENTORS
Edward Koppelman
Arthur R. Campman
BY
Harness, Dickey & Pierce
ATTORNEYS INVENTORS.
Edward Koppelman
Arthur R. Campman
BY
Harness, Dickey & Pierce
ATTORNEYS

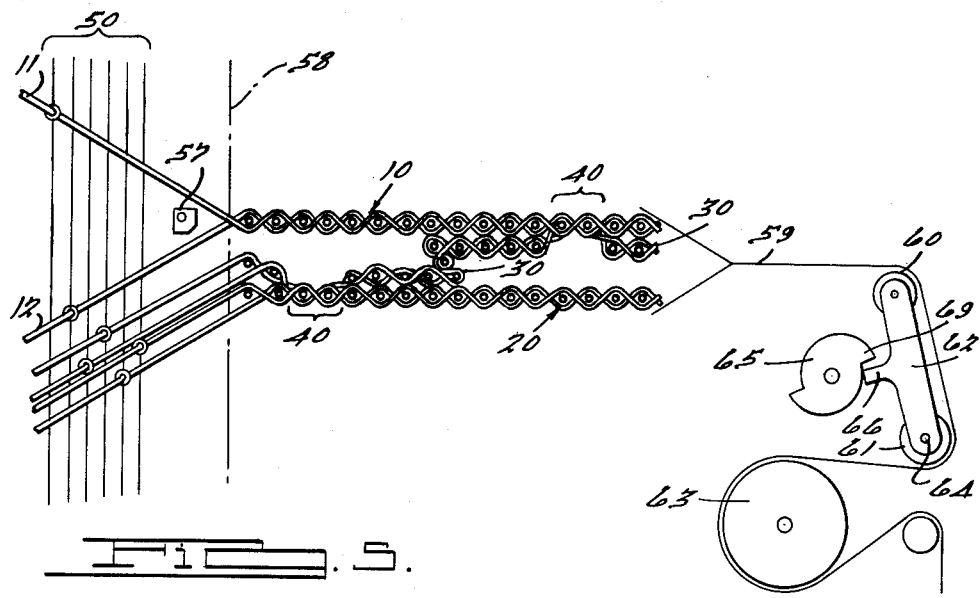
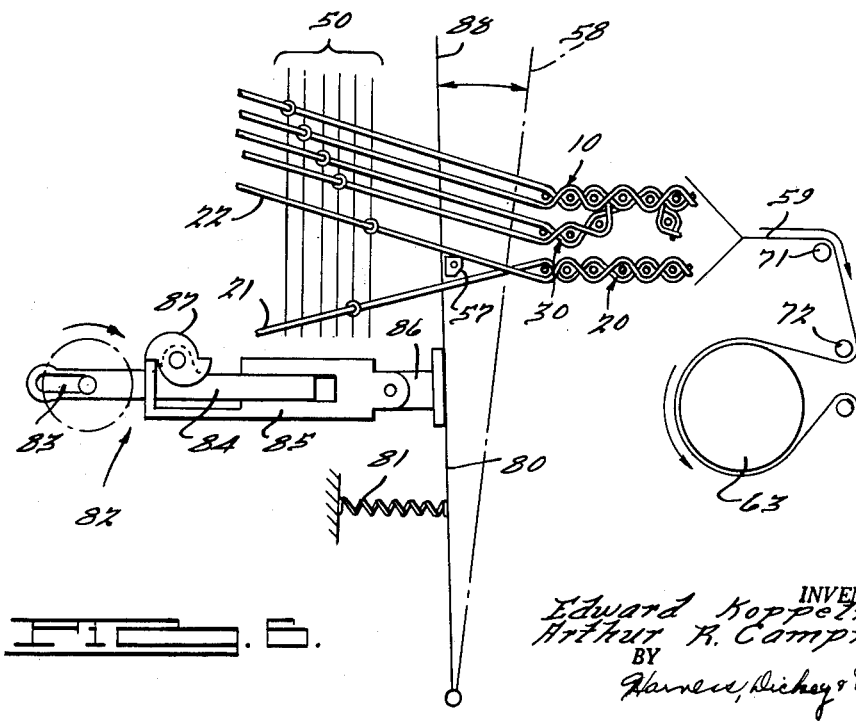

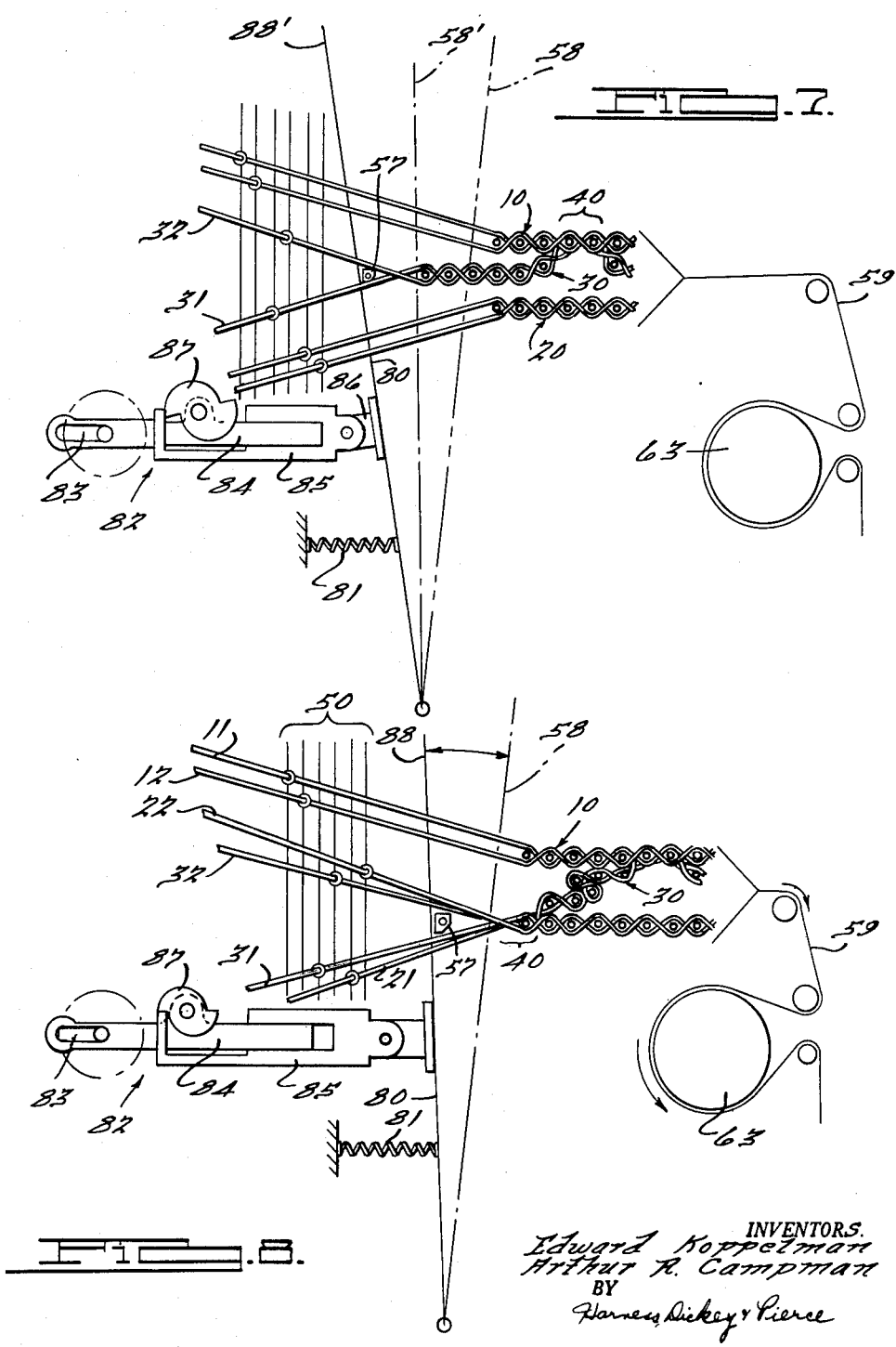

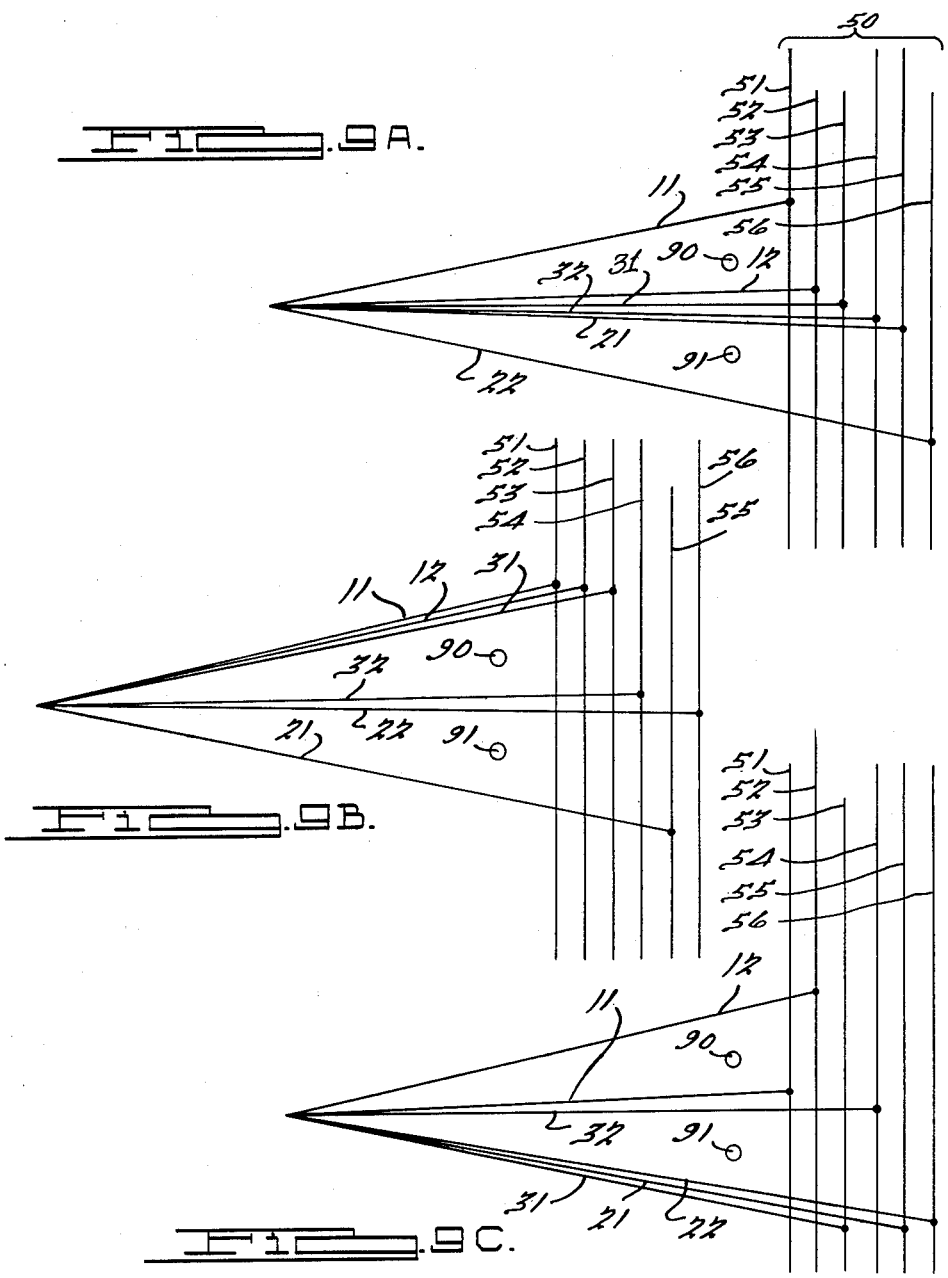

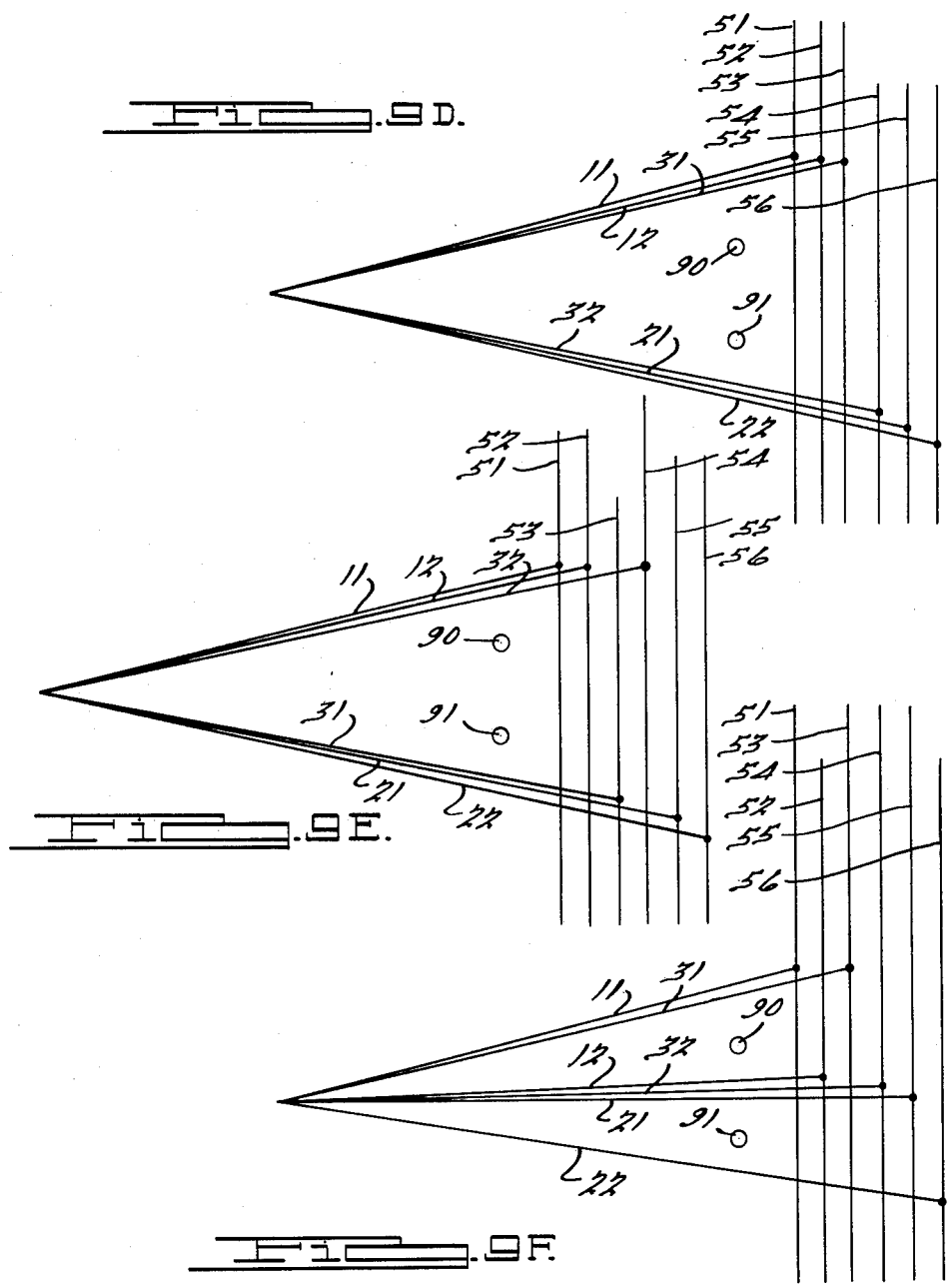

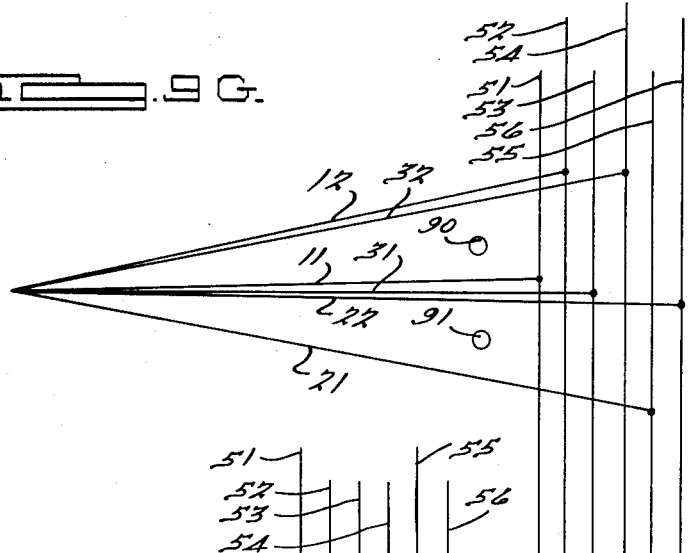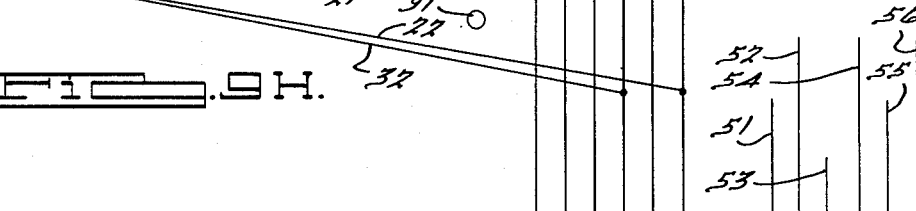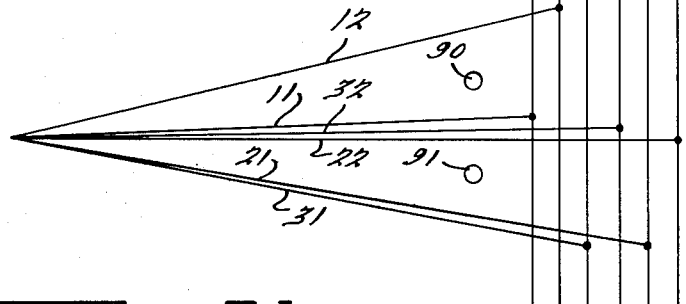

Sept. 21, 1965  E. KOPPELMAN ETAL  3,207,185
WOVEN PANEL AND METHOD OF MAKING SAME
Original Filed Feb. 23, 1961  12 Sheets-Sheet 8
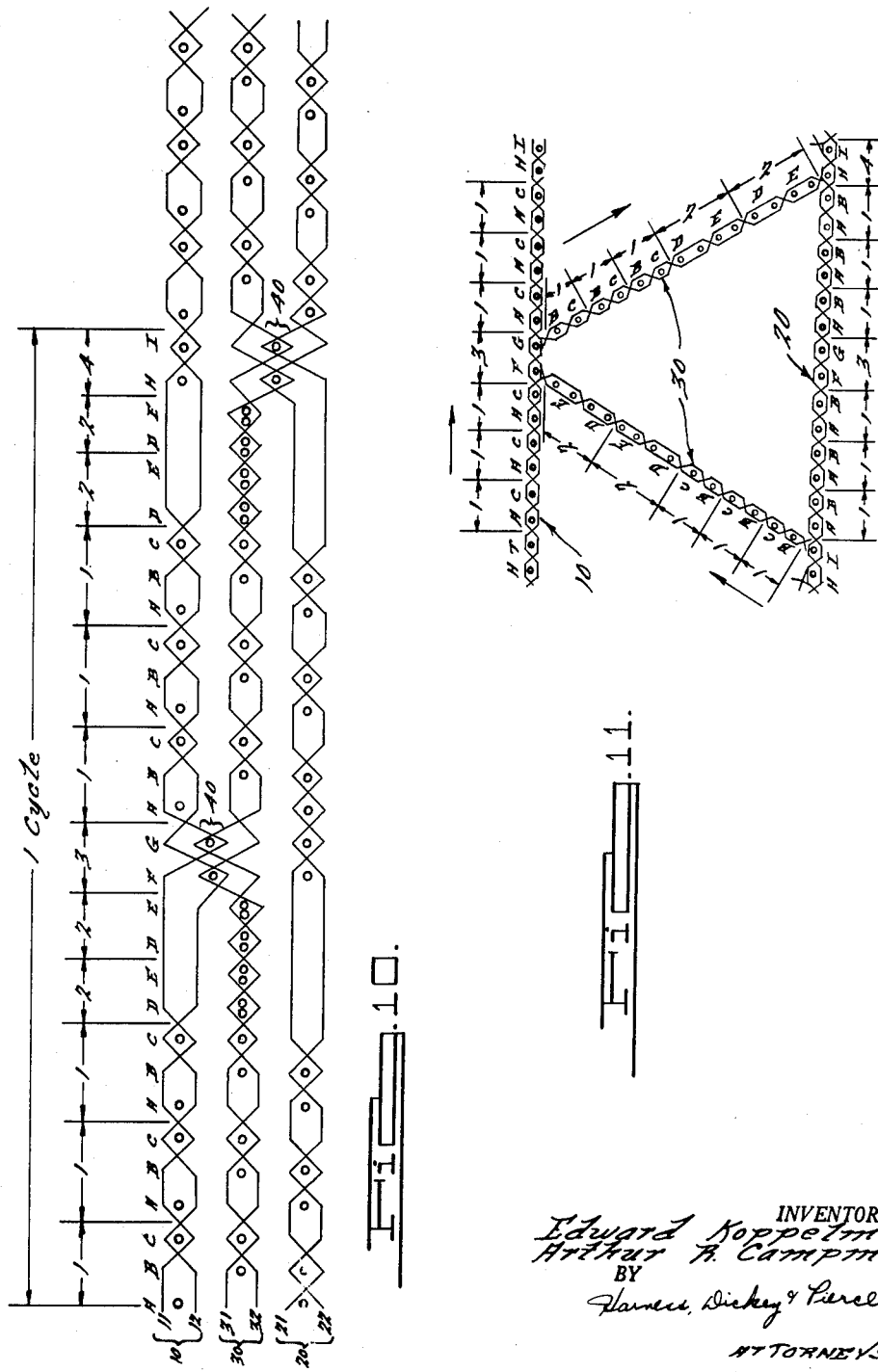

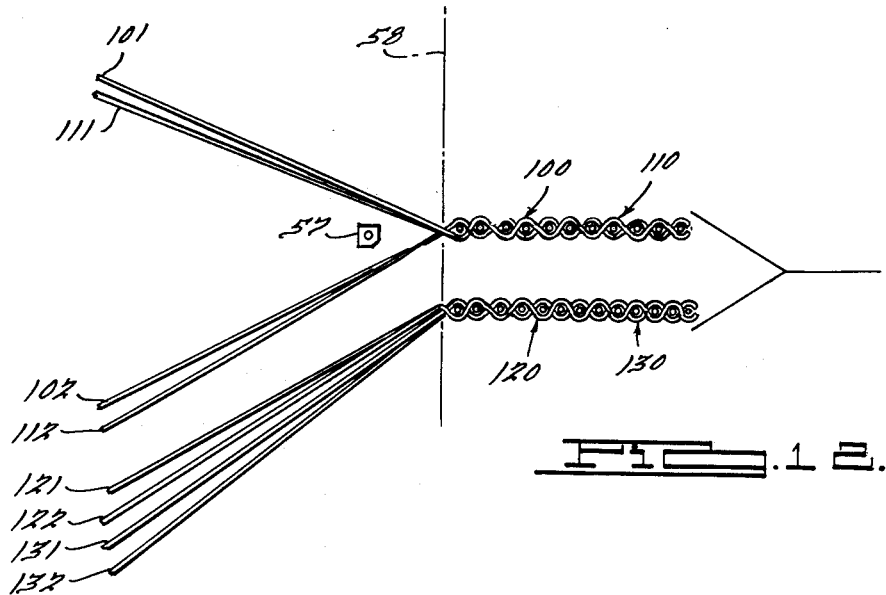
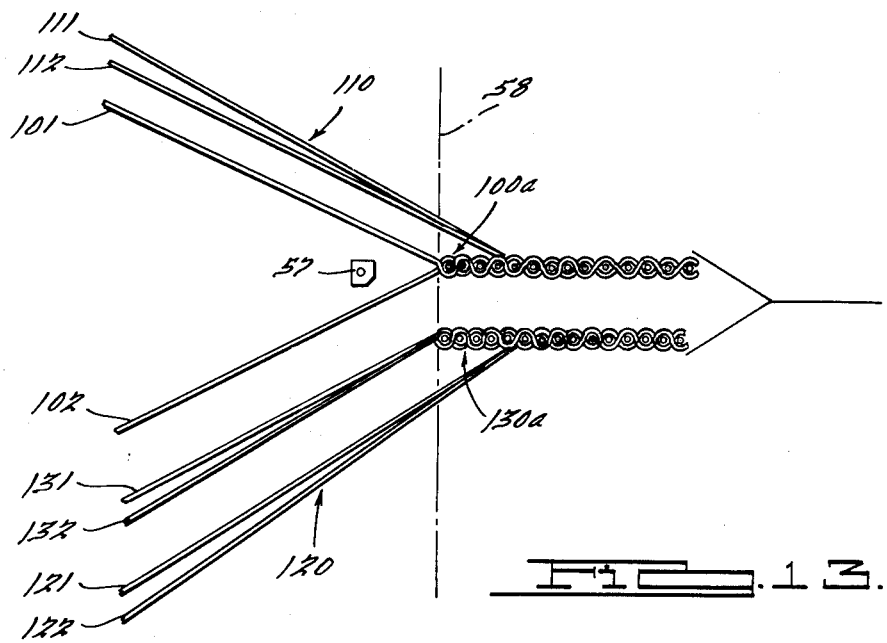

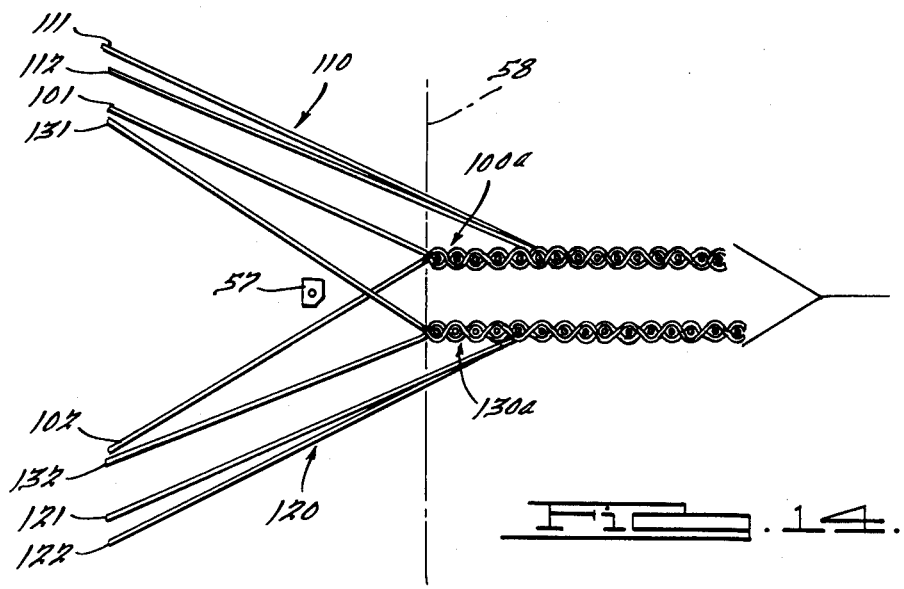
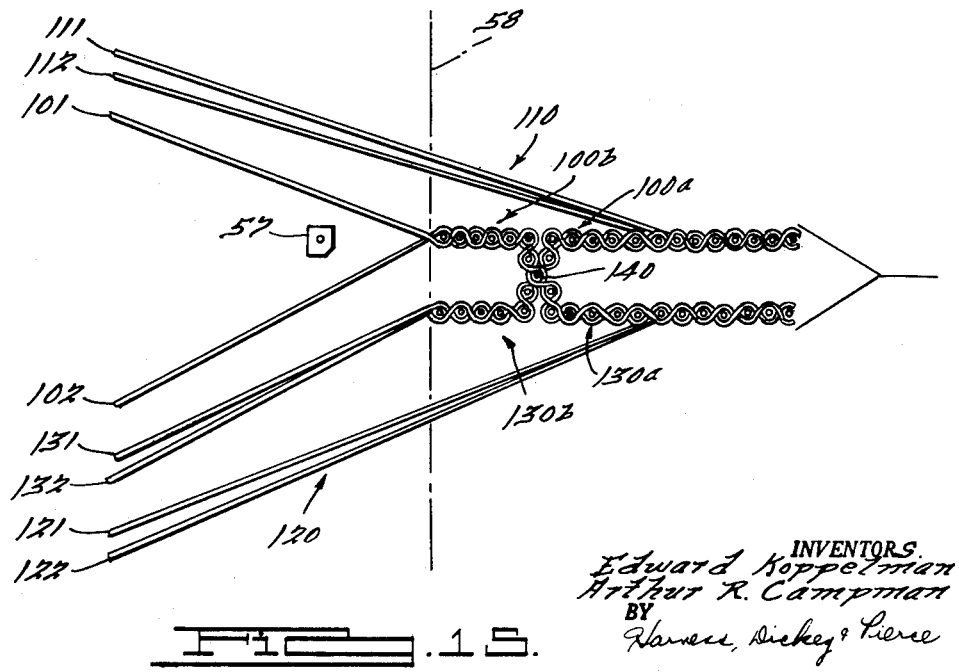

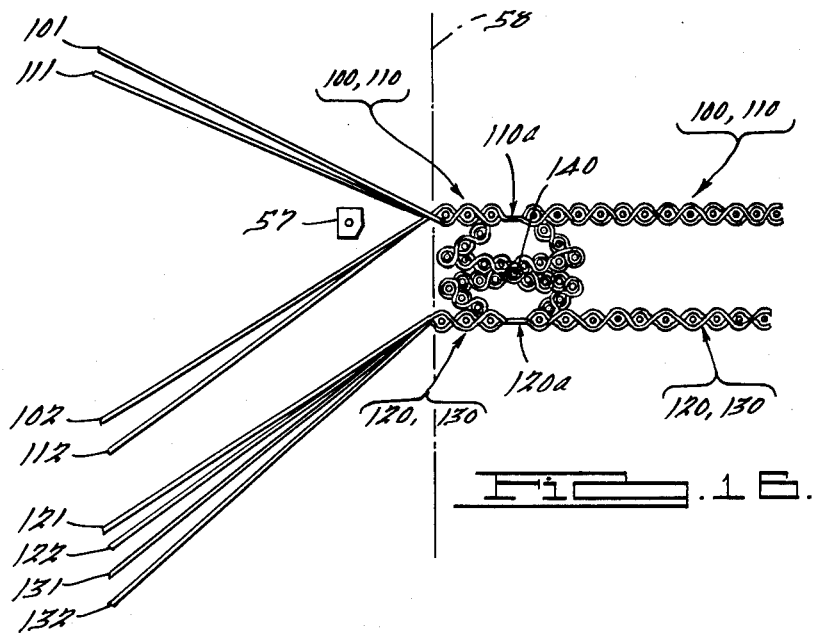
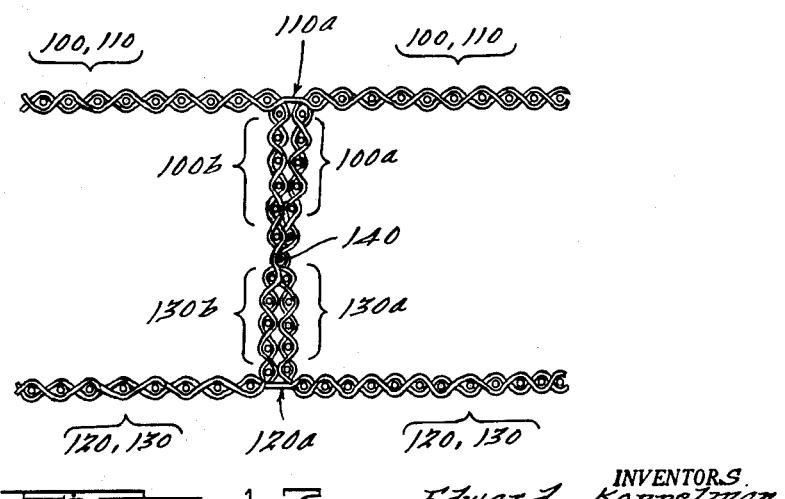

Sept. 21, 1965   E. KOPPELMAN ETAL   3,207,185
WOVEN PANEL AND METHOD OF MAKING SAME
Original Filed Feb. 23, 1961   12 Sheets-Sheet 12
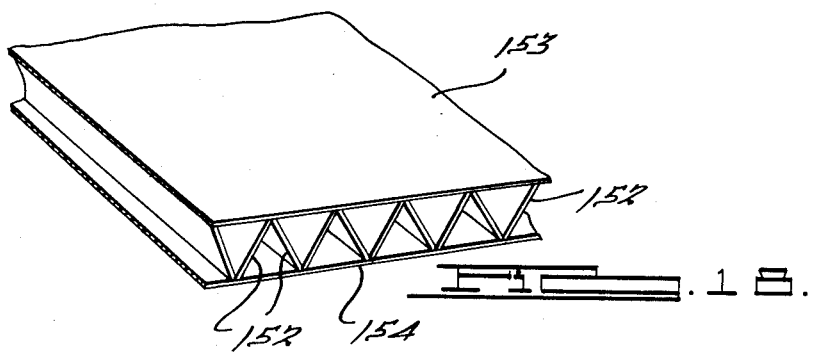
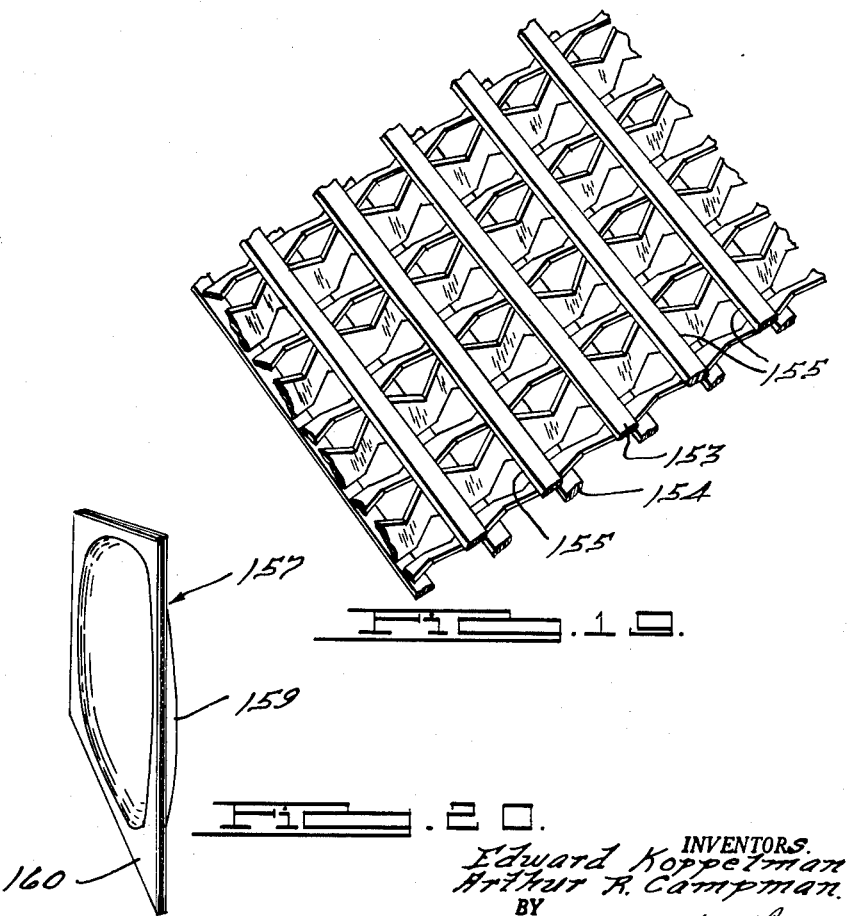
INVENTORS.
Edward Koppelman
Arthur R. Campman
BY
Harness, Dickey & Pierce
ATTORNEYS

United States Patent Office

3,207,185
Patented Sept. 21, 1965

1

3,207,185
WOVEN PANEL AND METHOD OF
MAKING SAME
Edward Koppelman, Huntington Park, and Arthur R. Campman, Los Angeles, Calif., assignors to Raymond Development Industries, Inc., a corporation of Delaware
Original application Feb. 23, 1961, Ser. No. 91,264, now Patent No. 3,090,406, dated May 21, 1963. Divided and this application Nov. 27, 1962, Ser. No. 240,293
2 Claims. (Cl. 139—20)

This invention relates generally to new and improved multiply woven fabric articles and to improved apparatus and methods for weaving such fabrics and producing such articles. This application is a division of copending application, Serial No. 91,264, filed February 23, 1961, now U.S. Patent No. 3,090,406.

There has been a need for many years for strong, lightweight, durable and inexpensive panels. While such needs and requirements are too extensive to enumerate here, by way of example it can be mentioned that industry has been seeking such panels for use in or as parts of walls, doors, skylights, canopies, roofs, lighting fixtures, insulators, floors, air frame components antenna radomes, reflectors, decks, body panels, reinforcement backings and the like.

Panels for the aforementioned uses may be required to be translucent or opaque, large or small, of various thicknesses, of different temperature or sound insulating characteristics, fire resistant or retardant, flat or curved, liquid impervious or porous, flexible or rigid, delamination resistant, weather or sun proof, of different load support or deflection characteristics formed of different materials, capable of substantial variations in design and appearance, and capable of being painted, treated or having different materials laminated thereto. Many attempts have been made to provide panels suitable for such wide usage and capable of meeting so many requirements, while being competitive and relatively inexpensive. So far as is known, such attempts have not proven entirely satisfactory.

Panels of the present invention are formed by weaving multiply fabrics to provide panels having opposed face plies interconnected by spaced ribs. Such fabrics may be woven of any suitable material or combination of materials such as glass, metal, natural or synthetic fibers, or the like. Although such fabrics are woven on a flat power loom, they are able to be expanded into three dimensional form to provide spaced parallel woven faces interconnected by a series of mutually spaced, generally transversely extending woven ribs. Not only are the ribs themselves woven, that is, consisting of interwoven warp and fill threads; but, at selected areas, are interwoven with the warp and fill threads of face plies so as to provide an integral woven fabric. While such woven fabrics may have many uses as they come from the loom, it is thought that in most cases the fabric will be treated or subjected to further work operations to provide a panel for a particular use. By way of example, in some cases the fabric may be impregnated to provide a fluid impervious, flexible envelope; in other cases, if the fabric is metal, it may be expanded and retained in its expanded position by brazing or the like; and in other cases, the fabric may be resinated and expanded, and the resin cured while the fabric is retained in an expanded or molded condition to provide a rigidified, expanded, reinforced plastic panel or article having a desired shape or contour. Thereafter, the opposed face plies may, if desired, be further treated such as for example by painting, cutting or laminating additional materials thereto to achieve a desired result, function or design.

2

The improved and novel structures and panels of this invention are obtained by the use of novel weaving apparatus and methods, as well as by the use, in certain cases, of novel and improved methods and means for treating or working the woven fabric to produce the aforementioned new and improved articles.

It is, therefore, an object of this invention to provide an improved article or panel capable of the aforementioned wide variety of uses and requirements in which novel and improved integral woven fabric having opposed faces and interconnecting ribs is employed.

It is a further object of this invention to provide improved methods and aparatus for weaving such an integral fabric and to provide an improved fabric for use in such articles or panels.

It is a further object of this invention to provide improved methods and means for treating or working such fabric to provide the aforementioned articles or panels.

It is a still further object of this invention to provide a fabric of the aforementioned type, and apparatus and methods for weaving the same, in which the density of the weave is uniformly maintained in both the face plies and the rib ply irrespective of whether the rib extends diagonally or perpendicularly relative to the face plies.

It is a still further object of this invention to provide improved apparatus and methods for forming the aforementioned articles or panels to different shapes or configurations.

It is a still further object of this invention to produce fabrics, articles or panels of the aforementioned type which are durable and of high quality in a relatively inexpensive manner.

These and other objects will become apparent from the following detailed description taken in conjunction with the accompanying drawings in which:

FIGURE 1 is a fragmentary, sectional view of a fragment of zig-zag diagonal fabric constructed according to the invention, the fabric being shown in the expanded condition;

FIG. 2 is a diagrammatic view showing such fabric being woven in the flat on a shuttle loom;

FIG. 5 is yet another similar view at a still further stage in the same process;

FIG. 6 is a view corresponding to FIG. 2, but showing an alternative method according to the invention;

FIG. 7 is the same as FIG. 6 at a later stage in the operation;

FIG. 8 is the same as FIG. 7 at a moment later than FIG. 7;

FIGS. 9A to 9I are diagrams illustrating the various positions that the heddle harness of a needle loom assumes in weaving such fabric in an alternative manner;

FIG. 10 is a diagram of the ply structure of the fabric as produced in accordance with FIGS. 9A to 9I;

FIG. 11 is a fragmentary, sectional view of the fabric of FIG. 10 in expanded condition;

FIG. 12 is a diagrammatic view of an alternative construction of fabric according to the invention, showing the fabric in course of manufacture on a flat loom;

FIGS. 13, 14, 15 and 16 are views similar to FIG. 12, each at a later stage in the same operation;

FIG. 17 is a view of the fabric produced by this method, the fabric being shown in expanded condition;

FIG. 18 is a fragmentary, perspective view of an expanded and rigidified panel in which the woven fabric is encased within a cured plastic;

FIG. 19 is a fragmentary, perspective view similar to

FIG. 18 illustrating the panel having its opposite faces notched to provide an ornamental effect; and FIG. 20 is a fragmentary, perspective view of an antenna radome molded to a predetermined shape.

Figure 3:
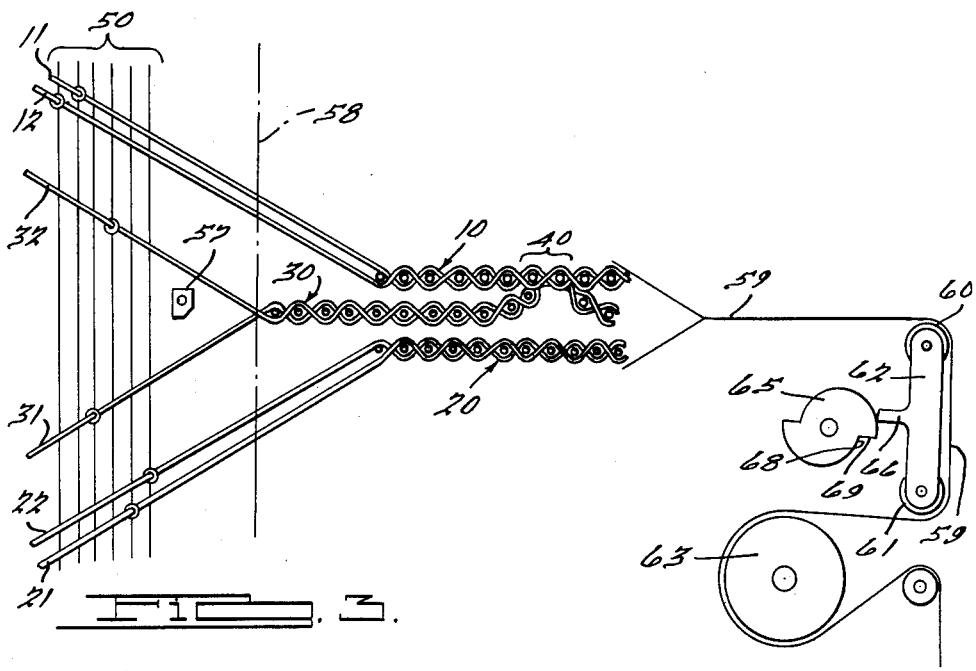
FIG. 3 is the same as FIG. 2 at a somewhat later stage in the process.
Figure 4:
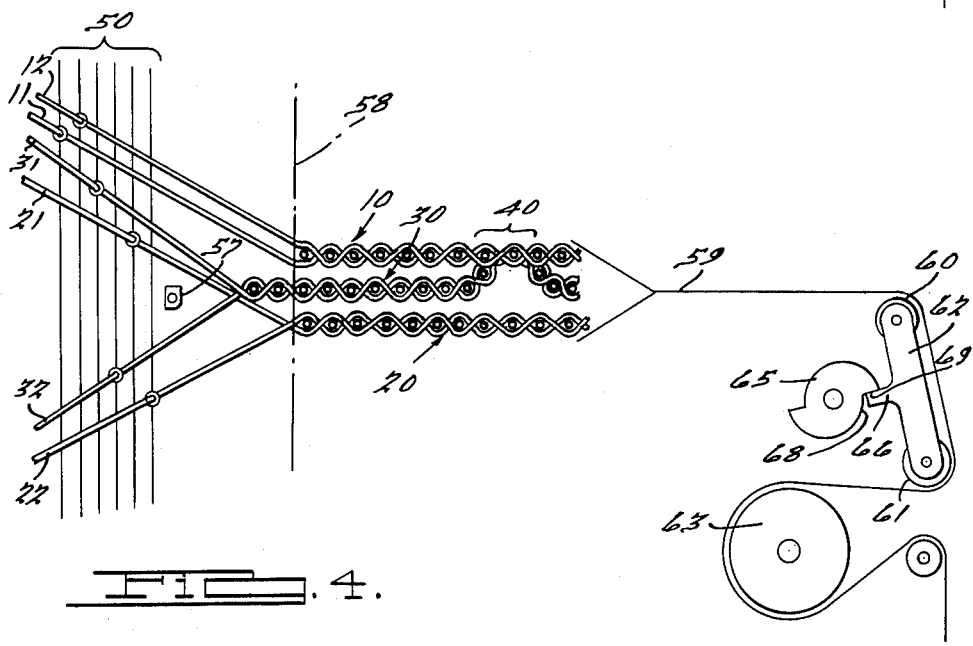
FIG. 4 is the same as FIG. 3 at a moment later than FIG. 3.

Reference will first be made to FIGS. 1 to 5 which demonstrate a first embodiment of the invention. FIG. 1 shows, in expanded position, a three-ply fabric that is to be manufactured in the flat on a loom. The fabric consists of a first face ply 10 made up of banks of warp threads 11 and 12, and fill threads 13; a second face ply 20 made up of banks of warp threads 21 and 22, and fill threads 23; and finally an intermediate rib ply which zigzags diagonally across from one face ply to the other and is itself similarly constructed of banks of warp threads 31 and 32, and fill threads 33. At areas 40, the warp threads of the rib ply 30 are interwoven with those of one of the face plies 10 or 20, sharing the face ply's fill threads 13 or 23 for a few picks. In the example shown in FIG. 1, the rib ply 30 shares the face ply's fill thread for two picks at each interwoven area 40, but obviously this number may be varied as desired to provide more or less interweaving between face and rib plies.

FIG. 2 shows how such a fabric may be manufactured on a loom. The loom is only shown diagrammatically, but may be a conventional box loom, such as manufactured by Crompton Knowles Weavers, Inc., under the name "Cotton King," modified as hereinafter described. The loom incorporates a conventional heddle harness 50 comprising individual heddles 51 to 56 controlling banks of warp threads 11, 12, 31, 32, 21 and 22 respectively. A conventional pattern chain and associated control mechanism controls the shedding and movement of the heddles in timed sequence with the shuttle and reed movement in the usual manner. FIG. 2 shows the harness 50 shedding warp threads 21 and 22 for passage of a shuttle 57. While diagrammatically only one shuttle 57 is shown, on the actual loom three shuttles are used, one for each ply. While the use of multiple shuttles in a loom of this type is common, a typical sequence which may be used is as follows. The shuttle for the top, or the first face ply is moved across the ply and the fill thread is beat up then the shuttle moves back to its box or initial position and the fill thread is again beat up. The second shuttle, for the intermediate or rib ply, then is moved back and forth with the fill being beaten up as described above and then the third shuttle, for the bottom or second face ply, is similarly moved back and forth and the fill similarly beaten up. The woven three ply fabric is advanced during these operations and in any desired sequence to provide the most uniform or desired woven fabric. This is of course controlled and determined by the "Dobby" programmer conventionally employed in looms of the aforesaid type. If only one shuttle were used a selvage would be formed at the edges of the fabric which would interlock all three plies and it would be necessary to cut such selvage to expand the fabric adjacent the selvage, although in some cases it may be desired to expand the fabric without cutting the selvage. By using three shuttles, such selvage interlock does not occur. The reed is not shown, for simplicity, but will be of conventional design. It will beat up the fill thread to the beat-up line 58.

All three plies are taken up lying flat on top of one another as a composite woven panel 59. This panel 59 passes first over idling rolls 60 and 61 of an auxiliary take-up device 62 and then around a standard, driven, take-up roll 63. The auxiliary take-up device 62 is mounted to rotate about a spindle 64 coaxial with roll 61, under the control of a cam 65 that bears against a projecting finger 66 of the device 62. The warps are tensioned in a conventional manner adjacent the warp beam and urge the device 62 anticlockwise, holding the finger 66 against the surface of cam 65.

In FIG. 2, the finger 66 bears against a low point 68 on the cam 65. As the latter is rotated anticlockwise, the finger 66 rides upon a gradually rising cam surface 68 until it engages one of the high points 69 of the cam, the condition seen in FIG. 3. The roll 61 does not change position during this movement, but roll 60 moves the distance demonstrated by a comparison of FIGS. 2 and 3. The cam 65 can be rotated by any suitable mechanism such as the lathe or beat up mechanism, in generally the same manner as the main take up roll 63. It is common practice in a loom of the aforementioned type to drive the take up roll by movement of the loom lathe such as through a ratchet and pawl arrangement. The cam can be similarly driven and the engagement of the pawl with the ratchet for either the take up roll or the cam can be controlled by the "Dobby" programmer so that the movement of the cam and/or the take up roll can be determined and controlled, relative to movements of the loom lathe or beat up mechanism to control the advancement of the fabric in the loom and to permit the cam to be driven while the take up roll remains stationary.

During this rotation of the cam 65 and the consequential clockwise swing of the device 62, the normal take-up roll 63 is idle, so that the woven panel 59 is advanced each pick by an amount determined by the rate of travel to the right of the roll 60 of the device 62. During this period of auxiliary take-up operation, the heddle harness 50 is operated to shed only the warp threads 31 and 32 of the rib ply 30, as FIG. 3 demonstrates. As a result, this ply continues to be woven for a few picks (4 in the example), while the face plies 10 and 20 remain temporarily idle.

As soon as the cam high point 69 has passed the finger 66, the tension on the warps returns the device 62 immediately to its extreme leftward position. The panel 59 is consequently moved bodily to the left to return to its original position. As all the warp threads are maintained under tension in the usual way, the plies take up the position shown in FIG. 4 with the unwoven ends of the face plies 10 and 20 returned to the beat-up line 58. The rib ply 30, therefore, necessarily projects by the distance of four (in this particular instance) fill threads beyond the beat-up line 58, but the reed will push the rib ply up to the beat-up line in an accordion-like fashion as demonstrated in FIG. 5. Plies 20 and 30 are now shed together for, in this instance, two picks to form the next interwoven area 40. When the fill threads of these two picks are beated up, they are of course beaten up fully to the beat-up line 58, which causes some slack to form in the rib ply 30 between the interwoven area 40 just being formed and the previous interwoven area 40. FIG. 5 shows the situation some few picks later after the last interwoven area 40 has been formed and individual weaving of each ply has been resumed. This figure shows the resultant slack formed in the rib ply 30 between successive interwoven areas 40 so that the ribs lie loose or as "relaxed folds" between the face plies.

The operation now continues as before with the cam 65 inactive and the main take-up roll 63 providing the necessary advancement of the panel 59, until it again becomes necessary to provide additional fill threads in the rib ply 30, when the cam 65 is again turned slowly through half a revolution (in the time taken for four picks) while the main take-up roll 63 is stopped. Release of the auxiliary take-up device 62 then follows with formation of a fresh interwoven area 40 interweaving the rib ply 30 with the face ply 10. The cam is driven by suitable means so that it rotates a predetermined angular distance for each pick and in accordance with the necessary extra picks needed in the rib ply, all of which is determined when the machine is set up to weave a particular fabric.

The fabric formed by this process is seen in FIG. 1, the four additional fill threads 33 in the rib ply 30 woven during operation of the auxiliary take-up device 62 being shown at X. The number of additional fill threads inserted in each rib, in relation to the number of fill threads in each ply between adjacent interwoven areas 40, can be varied to vary the angle of inclination of the ribs and/or vary the spacing between the face plies.

It is desired to emphasize that by the present method, a multiply fabric can be produced on a flat loom, in which fabric it is possible to provide diagonal, fully woven ribs of virtually and chosen angle of inclination to the face plies. Moreover, it is possible to form a fabric in which alternate ribs are oppositely inclined, whereby to form cavities of triangular cross-section in the fabric. Although the ability to form the ribs at oppositely directed diagnols is one of the principal merits of the invention, the method can nevertheless be used if desired to form truly vertical ribs if the occasion demands. The process has an inherent flexibility in regard to the inclination given to the ribs. For example, by forming the cam 65 with high points of different heights, or providing a plurality or different cams selectable as desired, the inclination of successive ribs can be varied in accordance with any required program as the weaving proceeds.

It will be noted that with the modified loom mechanism described, the fill thread density of the fabric is maintained substantially constant at all times. The fill thread density is the number of fill threads per unit length of a ply, and it will be observed that fabric woven according to the process described hereinabove has substantially the same fill thread density for the rib ply and the face plies at all times. This is important in the production of commercial products where uniform physical properties or appearance is desired. Furthermore, in the production of commercially acceptable fabrics or panels whose thickness is ¾ inch or more (when expanded), it appears necessary to modify the loom, as herein set forth, in order to produce a satisfactory product. It has been found that relatively thin fabrics or panels, such as ⅝ inch or less (when expanded) can be produced on an unmodified loom, as herein described, by beating up the fill in the rib ply tighter than the fill in the face plies. While such a product is not uniform, it has been found to be satisfactory for some commercial uses.

It will have been noted that, so far, reference has been made chiefly to the manufacture of a three-ply fabric. The process is equally applicable in principle to multiply fabrics generally, provided at least three plies are involved. Thus, in making reference herein, and especially in the appended claims, to a "three-ply fabric," it is intended to refer to a fabric having at least three basic plies woven together in the relationship herein described, whether or not additional plies are interwoven or otherwise interconnected therewith and regardless of whether any such additional plies are interconnected with the three basic plies in a manner within the present invention or not.

The method of forming a fabric according to the present invention illustrated in FIGS. 2 to 5, is one method of operation when a shuttle loom is employed. An alternative method is, however, shown in FIGS. 6 to 8, and FIGS. 9 to 11 illustrate how the inventive process may be employed with a needle loom.

The method of forming a fabric according to the present This method is quite similar to that of FIGS. 2 to 5, in that the line of weaving of the rib ply can be temporarily shifted in relation to the face plies so as to add additional fill threads to the rib plies to provide the necessary slack in the ribs when they are lying flat, in order to permit proper expansion of the fabric as before. However, this time, instead of reciprocating the take-up mechanism to advance the panel and then momentarily to return it backwardly on the loom, a like effect is produced by moving the reed frame so as to modify the beat-up line.

FIG. 6 shows a stage in this process comparable to FIG. 2, with each ply 10, 20 and 30 being woven separately and the woven panel 59 passing over idler rolls 71 and 72 and driven take-up roll 63, all fixed in position. FIG. 6 shows the wrap threads 21 and 22 of the face ply 20 forming the shed for shuttle 57. The beat-up line is again illustrated by the line 58, the reed frame 80 also being shown in this view. This frame 80 is urged towards the beat-up line 58 by a compression spring 81, and is controlled by an oscillating mechanism 82 comprising a crank 83 and a pair of arms 84 and 85 slidingly engaging one another. The arm 84 is connected to the crank 83 which imparts reciprocating motion to the assembly, and the arm 85 is pivotally connected to a bracket 86 which in turn transmits the motion to the reed frame 80. A cam 87 similar to the cam 65 is rotatably mounted on the arm 84 with its operating face engaging a portion of the arm 85. The movement of cam 87 is controlled in any suitable manner such as previously described in connection with cam 65. When the cam 87 is in the position shown in FIGS 6, with a low point on its periphery engaging the arm 85, the spring 81 can pull the arms 84 and 85 apart somewhat, thus effectively elongating the linkage between the crank 83 and the reed frame 80. With the crank 83 at outer dead center as shown, the reed frame 80 is withdrawn to line 88 behind the line of the shuttle pass. Rotation of crank 83 to inner dead center allows movement of reed frame 80 to the beat-up line 58 under the urging of spring 81.

Now, when cam 87 is rotated clockwise one-half turn to bring one of its high points to bear against the cooperating portion of arm 85, the parts take up the positions shown in FIG. 7. Here the arms 84 and 85 are forced together and the effective linkage length between crank 83 and reed frame 80 is shortened. This causes the reed frame 80 to oscillate between modified lines 58' and 88'. Movement from the FIG. 6 to the FIG 7 position does not take place instantaneously. As in the example of FIGS. 2 to 5, the movement is gradual. The take-up roll 63 is stopped, and the cam 87 is started. The lines 58 and 88 defining the limits of oscillation of the reed frame 80 gradually move towards the positions 58' and 88' as weaving of fill threads in the rib ply 30 continues. The speed rotation of cam 87 in relation to the weaving rate will thus determine how many picks are made and how many additional fill threads are inserted in the rib ply before the high point on the cam 87 passes beyond its cooperating surface on the arm 85 to again take up an idle condition with the reed frame 80 oscillating between its basic lines 58 and 88. FIG. 8 shows this later condition with the take-up roll 63 restarted, the first fill thread of an interwoven area 40 in place, and the warp threads shed to receive the second fill thread of such interwoven area. The weaving then continues as before. FIG. 8 demonstrates the slack that is produced in the rib ply 30 by the temporary advancement of the beat-up line 58 while the warp threads of the rib ply where being shed, combination with the subsequent return movement of the beat-up line preparatory to weaving the interwoven areas 40, and sequently to the individual weaving of the three plies.

The description will now turn to consideration of the alternative method illustrated in FIGS. 9 to 11 which demonstrate how the method of the invention can be performed in a needle type loom; i.e., a loom in which reciprocating fill needles are used instead to shuttles. Control over the movement of the needles is obtained in a suitable manner well known in the art. FIGS. 9A to 9I each show the heddle harness 50 of a two needle loom, the respective views showing the different positions that such harness will be made to adopt, and the corresponding wrap thread planes.

FIGS. 9A, 9B and 9C show the harness 50 in standard weaving sequences. In FIG. 9A, warp threads 11 and 12 of face ply 10 are shed to receive one needle 90, while warp threads 21 and 22 of face ply 20 are shed to receive the second needle 91. The result will be weaving of both plies. At the next pick, the harness occupies the position of FIG. 9B and a fill thread is inserted between the warp threads of the face ply 20 and those of the rib ply 30. At the third pick, the harness occupies the position of FIG. 9C, a fill thread being inserted between the warp threads of the face ply 10 and those of the rib ply 30.

Before describing FIGS. 9D to 9I, reference will be made to FIG. 10 which illustrates diagrammatically the fill placing effect of the sequence of harness operations already described with reference to FIGS. 9A to 9C. On the extreme left of FIG. 10, the first three picks are shown labeled A, B and C, respectively, and these will be seen to correspond to the picks obtained with the harness in the positions of FIGS. 9A to 9C, respectively. This first sub-cycle, designated 1 in FIG. 10, is then repeated twice, the result being independent and uniform weaving of the plies 10, 20 and 30 as entirely separate plies.

A second type of sub-cycle 2 is then employed twice, this sub-cycle 2 consisting of picks D and E which are obtained with the harness in the positions of FIGS. 9D and 9E, respectively. During sub-cycle 2 all the fill threads are inserted between warp threads 31 and 32 of the rib ply 30.

Next follows a single occurrence of a sub-cycle 3 which consists of picks F and G obtained with the harness in the positions of FIGS. 9F and 9G, respectively. In the FIG. 9F position plies 10 and 30 share a common shed and needle 90 and hence a common fill thread. The FIG. 9G position is similar with the warp threads merely reversed. The effect, as FIG. 10 demonstrates, is to interweave plies 10 and 30 to form an interwoven area 40, while the other face ply 20 is woven independently.

Three repeats of sub-cycle 1 then follow, and two repeats of sub-cycle 2. The overall cycle is then concluded with a single sub-cycle 4, consisting of picks H and I obtained with the harness positions of FIGS. 9H and 9I. In both positions, the warps of plies 20 and 30 share a common fill thread which results in formation of a second interwoven area 40. The modified take-up mechanism shown and described in conjunction with FIGS. 2 to 5, or the modified beat-up arrangement of FIGS. 6 to 8, would be incorporated in this needle loom in the same manner and for the same reasons previously set forth.

When the fabric thus woven is opened up into expanded position, the resultant weave is as shown in FIG. 11. The slope of the diagonal ribs formed by the rib ply can be varied by modifying the number of times sub-cycle 2 is repeated, since this sub-cycle (positions D and E) is responsible for the additional fill threads inserted in each rib.

The operation just described, and also the methods previuosly described in relation to FIGS. 2 to 5 and FIGS. 6 to 8, consist essentially of continuing to weave the three plies separately while interspersing such separate weaving with spaced interwoven areas at which the rib ply is joined alternately to one face ply and then to the other. At some stage during each such weaving of the plies separately, a greater length of rib ply is woven than of said face plies.

The alternative shown in FIGS. 12 to 17 employs eight banks of warp threads in a four-ply arrangement. The plies are designated 100, 110, 120 and 130, and their respective warp banks are shown as 101, 102; 111, 112; 121, 122; and 131, 132. As in the previous embodiments, the method employs the feature of advancing and then retarding the beat-up line 58, either by a special take-up mechanism such as shown in FIGS. 2 to 5, or by movement of the range of travel of the reed, in the manner of FIGS. 6 to 8.

Initially, plies 100 and 110 are woven together with common fill threads, plies 120 and 130 being simultaneously woven together but sepaartely from plies 100 and 110. FIG. 12 shows this condition in association with a shuttle 57 for making a pass through a shed formed between warp thread banks 101, 111 and 102, 112.

Weaving of plies 110 and 120 is then interrupted while weaving plies 100 and 130 continues. FIG. 13 shows this condition, these portions of the plies 100 and 130 being designated 100a and 130a. After the plies 100 and 130 have thus been separately woven with fill threads for some distance, they are woven together with a common fill thread for one pick in the example illustrated. FIG. 14 shows the warp banks 101, 131 and 102, 132 shed for such an interweaving pick. Separate weaving of the plies 100 and 130 then continues as 100b and 130b, as shown in FIG. 15, on which the fill thread of the interwoven pick is designated 140.

During this time the warp threads of the plies 110, 120 have continued to float, that is, remain unwoven. Now the fabric is returned on the loom by reverse movement of the take-up mechanism or otherwise as aforesaid, and plies 100 and 110 are woven in common again, as also are plies 120 and 130. FIG. 16 shows this stage of the operation after three picks of interweaving. It will be observed that the portions of plies 100 and 130 woven while plies 110, 120 were floating, that is portions 100a, 100b, 130a and 130b, now lie loose, or as "relaxed folds," between the outside faces of the fabric which are constituted by double plies 100, 110 and 120, 130.

When the fabric is expanded, as shown in FIG. 17, the portions 100a, 100b, 130a and 130b form a perpendicular rib extending between the fabric faces. The floating portions 110a and 120a of the plies 110 and 120 can be made as short as desired, and preferably will in practice be so short that the outside faces of the fabric will each present, effectively, a continuous woven outer face.

At the formation of the next rib, the same two plies 100 and 130 can be used to form the rib, or alternatively, plies 110 and 120 can be used while plies 100 and 130 float in the same manner in which plies 110, 120 floated in the example just described.

Throughout the foregoing description reference has been made to warp threads. Normally true threads will be employed, but it is to be understood that the invention is equally applicable to the weaving of warp tapes or other variants sometimes used in the industry. By the same taken, the fill threads may be similarly modified, for which reason these parts are referred to in general terms in the appended claims as warp and fill "elements." It likewise will be understood that the warp and fill elements may be of any material capable of being woven and that the warp element material may differ from the fill element material.

While the woven fabric may be treated and worked in many ways and with many materials to produce articles or panels, only certain methods and materials will be discussed herein, it being understood that other methods and materials may be used.

FIG. 18 illustrates rigidified and expanded panel formed from the woven fabric previously described. In this particular panel, the warp and fill elements are glass fibers and the woven fabric is coated with a suitable resin. The resinated fabric is then opened by a tenter frame or other arrangement and mandrels are inserted in each opening between the ribs 152 and the opposed faces 153 and 154. The resinated fabric with the mandrels therein is then disposed in a press or the like where heat and pressure are applied so as to cure and rigidify the resin and produce either a flat panel as illustrated in FIG. 18, or a molded radome as illustrated in FIG. 20. The mandrels are normally removed after the rigid plastic panel is produced, but in some cases, the mandrels may be left in place so as to fill the spaces between the ribs and the faces. The color of the resin can be varied from substantially transparent to completely opaque to vary the translucence of the panel. The tightness of the weave also will, of course, vary the translucence as well as the material used to weave the fabric. Such factors may also affect the heat insulation, transmission characteristics and the sound insulation characteristics of the panel. The structural characteristics of the panel such as its compression, tension and shear values, its deflection values and other such physical characteristics can be varied by varying the fabric materials, weave density, denier or size of warp and fill elements, type of resin used and the amount of impregnation or saturation of the fabric by the resin. In addition, the spaces between the ribs and the faces may be partially or completely filled with material, such as plastic foam or the like, to provide improved insulation, absorption or other desired characteristics.

In the embodiment of the invention illustrated in FIG. 19, the opposite faces 153 and 154 of the rigidified panel such as shown in FIG. 18 have been suitably notched or cut at 155 by a grinding wheel or the like to provide a plurality of openings in each of the faces of the panel. This provides a decorative effect and panels of his nature have particular utility where unusual ornamental or artistic effects are desired as, for instance, in fluorescent lighting louvers. It will, of course, be appreciated that the notches or openings formed in the opposite faces of the panel may differ in shape and spacing so as to provide many different and varied effects.

In the embodiment of the invention illustrated in FIG. 20, an aircraft antenna radome 157 is illustrated in which the center portion 159 of the panel is molded to a somewhat dome or arcuate shape while the peripheral portions 160 are maintained flat. This is done while the mandrels are in place and such radomes have unusual strength and electrical properties, making them far superior to heretofore known and used radomes. It likewise will be appreciated that the panels may be molded to varying shapes and different materials may be laminated to one or both faces of the same, such as, for instance, metals so that such panels with metals applied thereto can serve as reflectors and the like. It similarly will be appreciated that any suitable material for decorative purposes may be laminated to one or both faces of the panels. It likewise will be appreciated that the woven fabrics may be composed of metal strands or threads interwoven in any of the manners previously described, and then brazed or otherwise bonded together to retain the panel in an expanded and rigidified condition. Still further, if desirable, the fabric can be treated by impregnating the opposite faces of the fabric with rubber or other sealing material so as to close the pores and provide a fabric envelope which is relatively flexible and which may be blown up, for instance, to provide domes, roofs or other similar structures.

It will thus be appreciated that this invention encompasses novel fabrics of different shapes which may be made of different materials and which may be fabricated or otherwise worked to provide a wide range and multiplicity of uses, constructions, appearances, designs and the like.

What is claimed is:

1. A shuttle loom for weaving a multi-ply fabric including first and second face plies and an intermediate rib ply having a greater flattened length than the first ply, said loom comprising main take-up means for regularly advancing a span of woven fabric extending from the beat-up line to said take-up means as weaving proceeds, and an auxiliary take-up device operative upon said span for advancing said span a predetermined distance additional to the advance effected by the main take-up means during weaving of only one of the first, second and intermediate plies and for subsequently returning said span said predetermined distance for subsequent interweaving of two of the first, second and intermediate plies.

2. A method of weaving an expansible, multi-ply, ribbed fabric on a flat loom, said fabric having a pair of face plies and a rib ply intermediate said face plies, said method comprising:
   (i) weaving the warp and fill elements of each said ply independently of those of the other plies while advancing the woven fabric on the loom to form each said ply separately from the other plies,
   (ii) weaving the warp and fill elements of the rib ply only while continuing to advance the woven fabric on the loom to generate a greater flattened length of rib ply than of said face plies,
   (ii) then returning the woven fabric backwardly on the loom,
   (iv) then interweaving the warp elements of said rib ply and the warp elements of a first one of said face plies with at least one common fill element to form a first interwoven area joining said rib ply to said first face ply to cause said rib ply to lie slack between such first interwoven area and an immediately previously formed similar interwoven area, while continuing to advance the woven fabric on the loom,
   (v) then again weaving the warp and fill elements of each said ply independently of those of the other plies while advancing the woven fabric on the loom to form each ply separately from the other plies,
   (vi) weaving the warp and fill elements of the rib ply only while continuing to advance the woven fabric on the loom to generate a greater flattened length of rib ply than of said face plies,
   (vii) then returning the woven fabric backwardly on the loom,
   (viii) then interweaving the warp elements of said rib ply and the warp elements of the second face ply with at least one common fill element to form a second interwoven area joining said rib ply to said second face ply to cause said rib ply to lie slack between such second interwoven area and the first previously formed interwoven area, while continuing to advance the woven fabric on the loom.

References Cited by the Examiner

UNITED STATES PATENTS

| Re. 24,007 | 5/55 | Foster | 139—384 X |
| 628,206 | 7/99 | Lutton | 139—24 |
| 1,647,234 | 11/27 | La Chapelle | 139—313 |
| 2,254,008 | 8/41 | French | 139—384.1 |
| 2,424,928 | 7/47 | Glendinning et al. | 139—384 |
| 2,848,018 | 8/58 | Neisler | 139—20 X |
| 3,048,198 | 8/62 | Koppelman et al. | 139—410 X |

FOREIGN PATENTS

| 47,529 | 2/37 | France. |
| | | (Addition to No. 806,436) |
| 585,242 | 9/33 | Germany. |
| 403,171 | 12/33 | Great Britain. |

DONALD W. PARKER, *Primary Examiner.*

RUSSELL C. MADER, *Examiner.*

UNITED STATES PATENT OFFICE
CERTIFICATE OF CORRECTION

Patent No. 3,207,185                      September 21, 1965

Edward Koppelman et al.

It is hereby certified that error appears in the above numbered patent requiring correction and that the said Letters Patent should read as corrected below.

Column 5, line 59, strike out "The method of forming a fabric according to the present" and insert instead -- The method of FIGS. 6 to 8 will be described first. --; column 6, line 16, for "FIGS 6" read -- FIG. 6 --; line 53, for "combination" read -- combined --; line 55, for "sequently" read -- subsequently --; column 7, line 72, for "sepaartely" read -- separately --; column 9, line 17, for "his" read -- this --.

Signed and sealed this 29th day of March 1966.

(SEAL)
Attest:

ERNEST W. SWIDER                      EDWARD J. BRENNER
Attesting Officer                       Commissioner of Patents